(12) United States Patent
Smith et al.

(10) Patent No.: US 6,522,710 B2
(45) Date of Patent: Feb. 18, 2003

(54) FASTENED SPACER FOR GRID OF A NUCLEAR REACTOR WITH ASSOCIATED METHOD

(75) Inventors: Michael G. Smith, Columbia, SC (US); David A. Dablock, Derry, PA (US); Nathaniel Robinson, Eastover, SC (US); Philip L. Hazlett, Columbia, SC (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/898,943

(22) Filed: Jul. 3, 2001

(65) Prior Publication Data

US 2003/0007590 A1 Jan. 9, 2003

(51) Int. Cl.[7] .................................................. G21C 3/34
(52) U.S. Cl. ........................ 376/442; 376/438; 376/449
(58) Field of Search ............................. 376/313, 352, 376/438, 442, 446, 449

(56) References Cited

U.S. PATENT DOCUMENTS

| | | | | | |
|---|---|---|---|---|---|
| 3,791,466 | A | * | 2/1974 | Patterson et al. ............. | 176/78 |
| 4,521,374 | A | * | 6/1985 | Duncan ....................... | 376/462 |
| 4,522,782 | A | * | 6/1985 | Leclercq ...................... | 376/438 |
| 4,818,479 | A | * | 4/1989 | Christainsen et al. ........ | 376/442 |
| 4,844,861 | A | * | 7/1989 | Leclercq ...................... | 376/439 |
| 5,154,879 | A | * | 10/1992 | Grattier ....................... | 376/352 |
| 5,343,508 | A | * | 8/1994 | Hatfield ....................... | 376/260 |

* cited by examiner

Primary Examiner—Harvey E. Behrend
Assistant Examiner—R. Palabrica (57) ABSTRACT

A spacer for use with a protective grid of a fuel assembly of a nuclear reactor is a generally washer-shaped plate of material having an engagement surface and a retention surface opposite one another. The protective grid is formed of a plurality of straps to define a plurality of fuel rod cells and a plurality of thimble cells, with the straps adjacent the thimble cells being notched to receive the spacer therein. The retention surface of the spacer is disposed against the notches, and the engagement surface of the spacer protrudes outwardly from the protective grid. When the engagement surfaces of the spacers are engaged against a lower nozzle of a fuel assembly of a nuclear reactor, the spacers space the protective grid from the lower nozzle. The spacer is integrally welded with the protective grid in a single arranging and welding operation.

12 Claims, 5 Drawing Sheets

FASTENED SPACER FOR GRID OF A NUCLEAR REACTOR WITH ASSOCIATED METHOD

BACKGROUND OF THE INVENTION

1. Field of the Invention

The present invention relates generally to nuclear reactors and, more particularly, to a spacer for use in spacing a protective grid from a nozzle of a fuel assembly of a nuclear reactor.

2. Description of the Related Art

Numerous types of nuclear reactors are known and understood in the relevant art. One type of nuclear reactor is a pressurized water reactor which typically includes a plurality of fuel assemblies that are disposed within a jacket through which pressurized water flows. Such water typically flows through the reactor vessel at high velocities, whereby any debris in the water can eventually cause significant wear to the reactor components with which the debris comes into contact.

Each fuel assembly typically includes a plurality of fuel rods that are mounted in a plurality of grids that space the fuel rods from one another and resist vibration of the fuel rods during operation of the reactor. The grids typically include a top grid, a bottom grid, and a plurality of middle grids that are spaced between the top and bottom grids. The grids typically are mounted on elongated thimble tubes that are hollow and can carry instrumentation and/or control rods therein. The fuel rods, grids, and thimble tubes together are mounted between an upper nozzle and a lower nozzle that retain the fuel rods, grids, and thimble tubes in a desired position within the nuclear reactor. The fuel rods, grids, thimble tubes, and nozzles make up the fuel assembly.

Due to the potential that debris may damage components of the fuel assembly, it is known to additionally provide a protective grid that is disposed between the bottom grid and the lower nozzle to protect the fuel rods from debris. It is also known to securely dispose the protective grid against the lower nozzle and to space the protective grid from the lower nozzle in order avoid undesirable contact between the lower nozzle and irregularities on the edges of the assembled straps. Examples of such irregularities would include any types of protruding materials such as welding tabs and other strap material at intersections where the straps out of which the grids are assembled are joined with one another.

All of the grids of the fuel assemblies of the nuclear reactor, including the protective grids, are typically made up of a plurality of straps that are arranged in a grid or lattice pattern and are fastened to one another to define a plurality of cells. The cells include thimble cells and fuel rod cells. The top grid, bottom grid, and middle grids typically are mechanically or otherwise fastened to the thimble tubes which are disposed in the thimble cells. The fuel rods typically are held within the fuel rod cells of the grids, including the protective grid, by a plurality of springs and/or dimples within each fuel rod cell that are formed on the straps of the grids.

The protective grid typically additionally includes spacer members that are welded or otherwise fastened thereon and that receive the ends of the thimble tubes therein and that securely dispose the protective grid against the bottom nozzle when the fuel assembly is assembled. While such known protective grids and spacer members have been generally effective for their intended purposes they have not been without limitation.

Previously known protective grids have employed spacer members in the form of either bent metal inserts or weldments of tubular sleeves with endplugs that have been spot welded within the thimble cells of the protective grid and have been configured to both receive the ends of the thimble tubes therein and space the protective grid from the lower nozzle. Dimensions of such spacer members are critical to ensure proper fit-up with the thimble tube diameter and the thimble cell width. The required close tolerances and the welding or bending operation result in a relatively costly spacer member. It is thus desired to provide a simplified spacer member that does not itself require welding or complicated forming.

Since such sleeves and inserts were disposed within the thimble cells of the protective grid, it was necessary to first fully arrange and interconnect the straps of the protective grid in a first arranging and welding operation, and to thereafter receive the sleeves or inserts within the thimble cells and perform a second welding operation therebetween. Such multiple assembly steps, both of which include arranging and welding operations, have been relatively costly. It is thus desired to provide a protective grid with an integrally welded spacer which is assembled with a single arranging and welding step.

In many fuel assemblies, the thimble cells and the fuel rod cells are of substantially the same size. Nevertheless, some fuel assemblies are designed such that the thimble cells are four times the size of the fuel rod cells. Such enlarged thimble cells are open areas of the grid that are the size of a two-by-two set of fuel rod cells. In known protective grids that employ sleeves or inserts, the sleeves or inserts would desirably be welded against the sides of the thimble cell at the points where the sleeves or inserts contact the straps of the thimble cell. In circumstances where the thimble cells are of the two fuel rod cell by two fuel rod cell size, however, the points of contact between the sleeves or inserts and the straps are areas where other straps terminate. Such contact areas thus are extremely difficult to weld due to such interference by the terminating straps. It is thus desired to provide an improved spacer that can be reliably welded to a protective grid in which the thimble cells thereof are of a two fuel rod cell by two fuel rod cell configuration.

SUMMARY OF THE INVENTION

In view of the foregoing, a spacer for use with a protective grid of a fuel assembly of a nuclear reactor is a generally washer-shaped plate of material having an engagement surface and a retention surface opposite one another. The protective grid is formed of a plurality of straps to define a plurality of fuel rod cells and a plurality of thimble cells, with the straps adjacent the thimble cells being notched to receive the spacer therein. The retention surface of the spacer is disposed against the notches, and the engagement surface of the spacer protrudes outwardly from the protective grid. When the engagement surfaces of the spacers are engaged against a lower nozzle of a fuel assembly of a nuclear reactor, the spacers space the protective grid from the lower nozzle. The spacer is integrally welded with the protective grid in a single arranging and welding operation.

An aspect of the present invention is to provide a spacer for use with a protective grid of a fuel assembly of a pressurized water reactor wherein the spacer is integrally welded with the protective grid in a single arranging and welding operation.

Another aspect of the present invention is to provide a spacer that is received in notches formed in the straps of a protective grid of a fuel assembly of a pressurized water reactor.

Another aspect of the present invention is to provide a spacer that has a generally plate-like configuration wherein the spacer can be produced in large quantities with required precision at relatively low cost.

Another aspect of the present invention is to provide a spacer in combination with a protective grid in which the spacer includes an engagement surface that protrudes outwardly from the protective grid to space the protective grid from a lower nozzle of a fuel assembly of a pressurized water reactor.

Another aspect of the present invention is to provide a protective grid in combination with a spacer in which the protective grid is formed with a plurality of thimble cells and fuel rod cells, with each of the thimble cells being four time the size of the fuel rod cells, and in which the spacer can be reliably welded to the straps adjacent the thimble cell.

Another aspect of the present invention is to provide a fuel assembly for a nuclear reactor having a spacer that is interposed between and that spaces a protective grid from a lower nozzle.

Another aspect of the present invention is to provide in combination a grid and a spacer for use in a fuel assembly of a nuclear reactor, in which the fuel assembly includes a nozzle, a thimble tube having an end, and a fastener, the fastener being structured to be cooperably connected with the thimble tube, and in which the general nature of the combination can be stated as including a grid including a plurality of straps interconnected with one another to define at least a first thimble cell, the straps each including an edge, a spacer in the form of a plate formed with a hole extending therethrough, the plate having a substantially planar engagement surface and a substantially planar retention surface opposite one another, the plate being fixedly mounted on the grid with the engagement surface protruding outwardly from the grid, the engagement surface being structured to be disposed against the nozzle to space the grid from the nozzle, the hole being structured to receive at least a portion of the fastener therethrough, and the retention surface being structured to receive the end of the thimble tube against it such that the plate is interposed between the nozzle and the end of the thimble tube when the fastener is received through the hole and is cooperably connected with the thimble tube. At least one of the straps that define the at least first thimble cell may include a notch formed in the edge, with the plate being at least partially disposed in the notch.

Another aspect of the present invention is to provide a fuel assembly for a nuclear reactor, in which the general nature of the fuel assembly can be stated as including a grid including a plurality of straps interconnected with one another to define at least a first thimble cell, the straps each including an edge, the edges being generally aligned along a plane that defines a grid surface of the grid, a first spacer in the form of a first plate having a substantially planar engagement surface and a substantially planar retention surface, the first plate being fixedly mounted on the grid with the engagement surface protruding outwardly from the grid surface, a thimble tube having an end, at least a portion of the thimble tube being received in the at least first thimble cell, a nozzle formed with at least a first opening, and a fastener engaged with the thimble tube, at least a portion of the fastener extending through the at least first opening in the nozzle, at least a portion of the fastener extending through the hole in the first plate, the first plate being interposed between the nozzle and the end of the thimble tube, with the engagement surface being disposed against the nozzle and the retention surface being disposed against the end of the thimble tube such that the grid surface is spaced from the nozzle.

Another aspect of the present invention is to provide a method of assembling a grid with a spacer, the general nature of which can be stated as including the steps of forming notches in a plurality of first straps and a plurality of second straps, each notch including a notch base and at least a first notch side, arranging the first and second straps in a grid pattern to define at least a first thimble cell, each of the first and second straps including an edge, the edges being generally aligned along a plane that defines a grid surface, receiving a spacer in the notches, the spacer being in the form of a plate having a substantially planar engagement surface and a substantially planar retention surface and being formed with a hole extending therethrough, protruding the engagement surface of the spacer outwardly from the grid surface, and fixedly attaching the first and second straps with one another and with the spacer in substantially a single fastening operation.

BRIEF DESCRIPTION OF THE DRAWINGS

A further understanding of the invention can be gained from the following description of the preferred embodiment when read in conjunction with the accompanying drawing in which.

Similar numerals refer to similar parts throughout the specification.

DESCRIPTION OF THE PREFERRED EMBODIMENT

Figure 6:
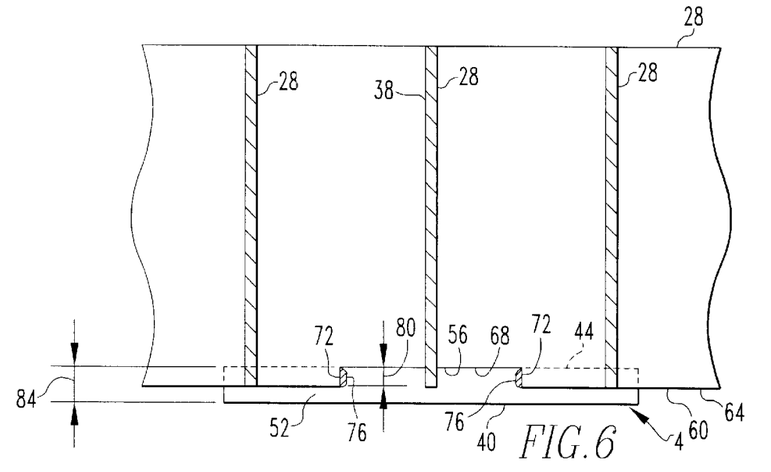
FIG. 6 is a sectional view as taken along line 6—6 of FIG. 5.
Figure 7:
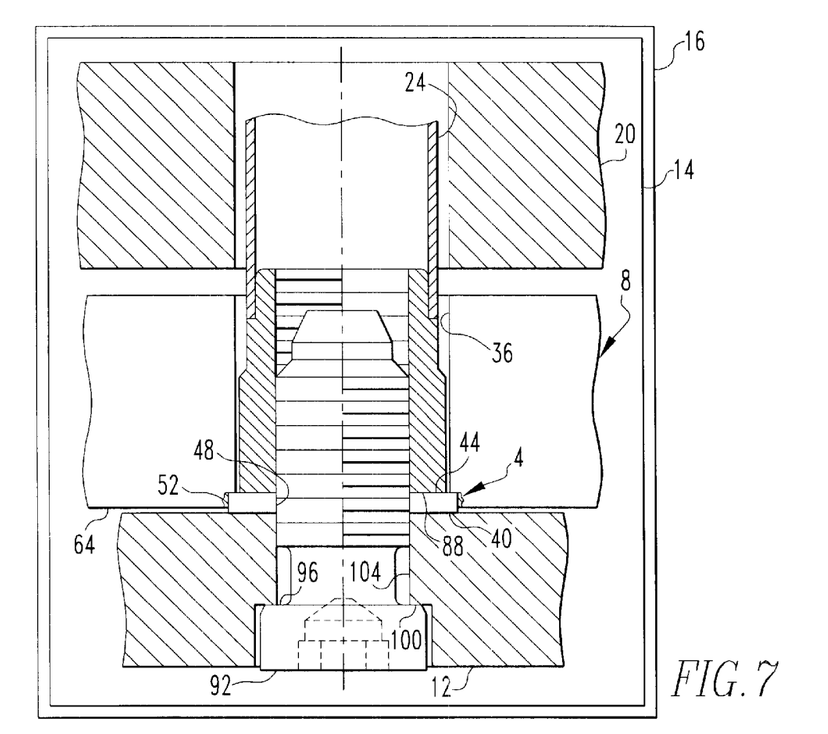
FIG. 7 is a schematic elevational view of a nuclear reactor in accordance with the present invention that incorporates the protective grid and the spacer therein.

A spacer 4 in accordance with the present invention is indicated generally in FIGS. 1–7. The spacer 4 is advantageously integrally welded to a protective grid 8 and spaces the protective grid 8 from a lower nozzle 12 to form a fuel assembly 14 of a nuclear reactor 16 (FIG. 7.) While the nuclear reactor 16 is depicted herein as being a pressurized water reactor, it is understood that the spacer 4 and protective grid 8 set forth herein potentially may be employed in other nuclear reactor applications without departing from the concept of the present invention.

As is understood in the relevant art, the nuclear reactor 16 typically includes a plurality of the fuel assemblies 14 that are disposed within a vessel (not shown), and pressurized water or other coolant is pumped at a high velocity through the vessel. Each fuel assembly 14 includes a plurality of fuel rods (not shown) that are mounted on a plurality of spaced grids that include a top grid (not shown), one or more middle grids (not shown) and a bottom grid 20 (FIG. 7.) The top grid, middle grids, and bottom grid 20 are mounted on a plurality of elongated thimble tubes 24 (FIG. 7), typically by welding or other attachment methodology. The top grid, middle grids, bottom grid 20, protective grid 8, fuel rods, and thimble tubes are disposed between an upper nozzle (not shown) and the lower nozzle 12 to form the fuel assembly 14. It is understood that the thimble tubes 24 support the top grid, middle grids, and bottom grid 20 in spaced relation, and the top grid, middle grids, and bottom grid 20 retain the fuel rods in a spaced relationship from one another.

As can be understood from FIGS. 1–6, the protective grid 8 is formed of a plurality of straps 28 that are arranged in a grid or lattice pattern and are fastened to one another to define a plurality of cells 32. The cells 32 include a plurality of fuel rod cells 34 and a plurality of thimble cells 36. The top grid, the middle grids, and the bottom grid 20 are similarly formed out of a plurality of straps to define a plurality of cells, although the specific configuration if the top grid, middle grids, and bottom grid 20 will be discussed no further.

The straps 28, as well as the thimble tubes 24 and the spacers 4, are formed of a material that is suited to withstand the elevated temperature and radiation environment of the nuclear reactor 16. As such, the aforementioned structures may be manufactured out of a metal alloy such as Zircaloy, although other appropriate materials may be employed for manufacturing these structures without departing from the concept of the present invention.

Figure 1:
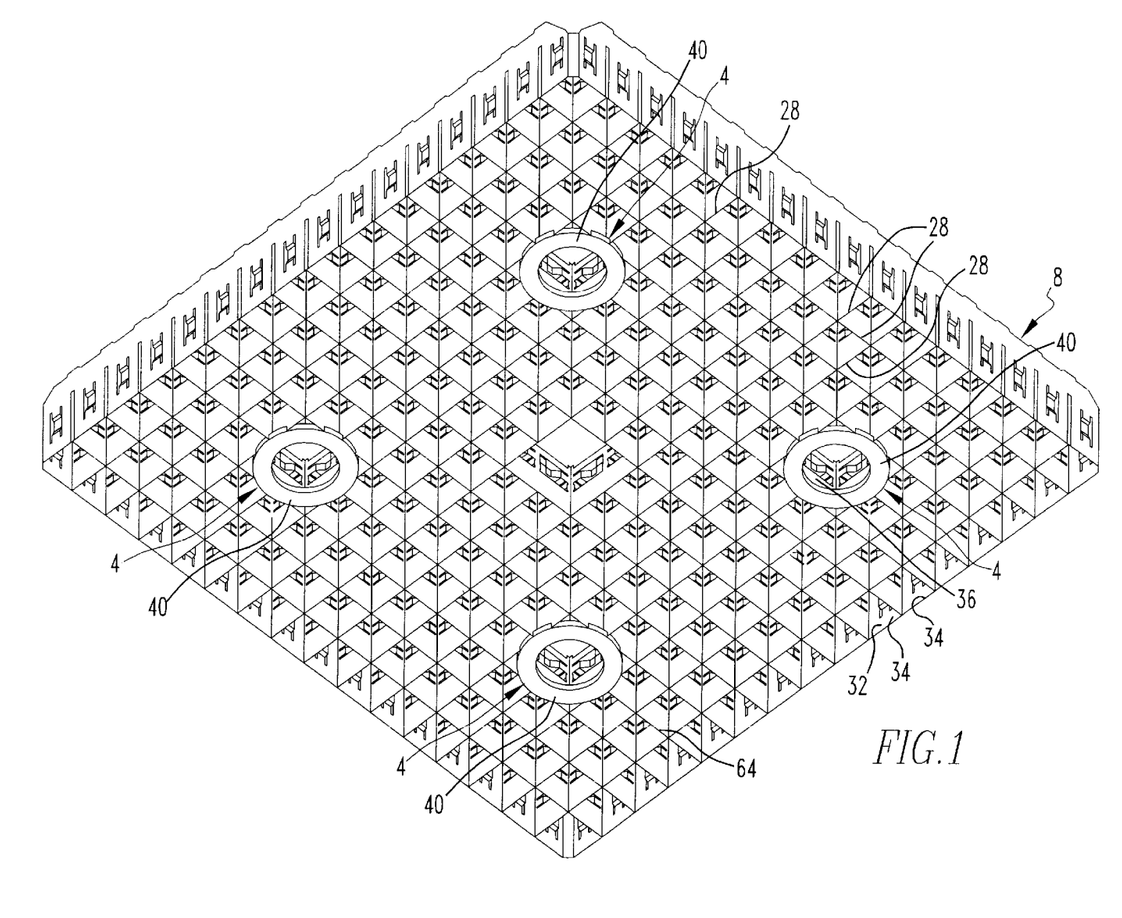
FIG. 1 is an isometric view of the underside of a protective grid and a plurality of spacers in accordance with the present invention.
Figure 2:
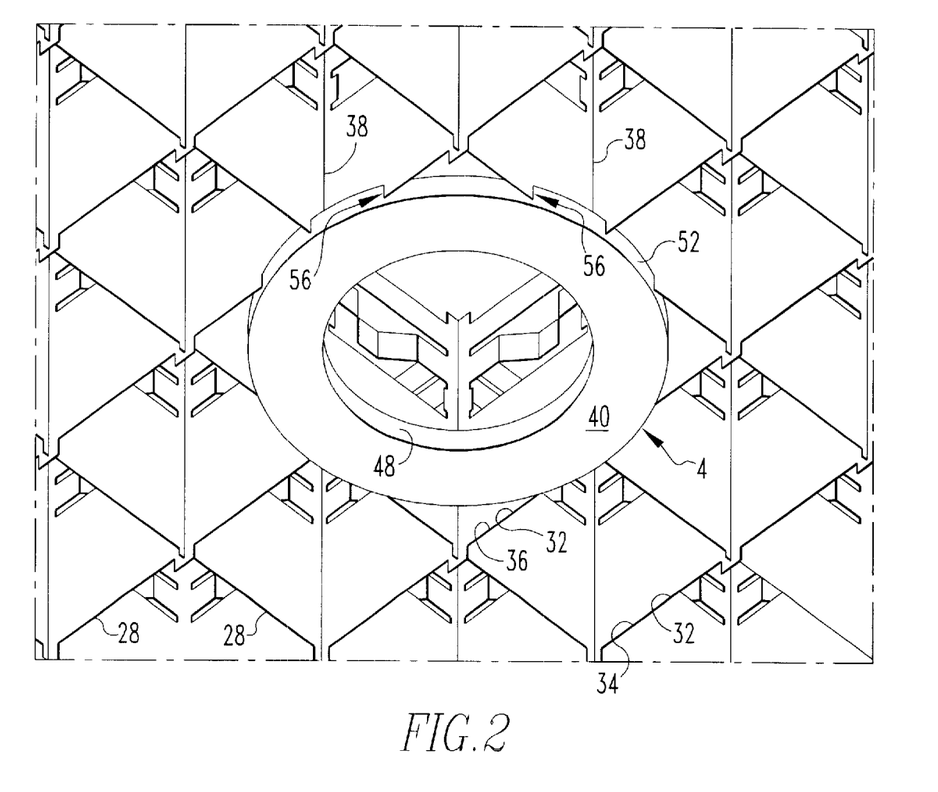
FIG. 2 is an enlarged view of a portion of FIG. 1
Figure 3:
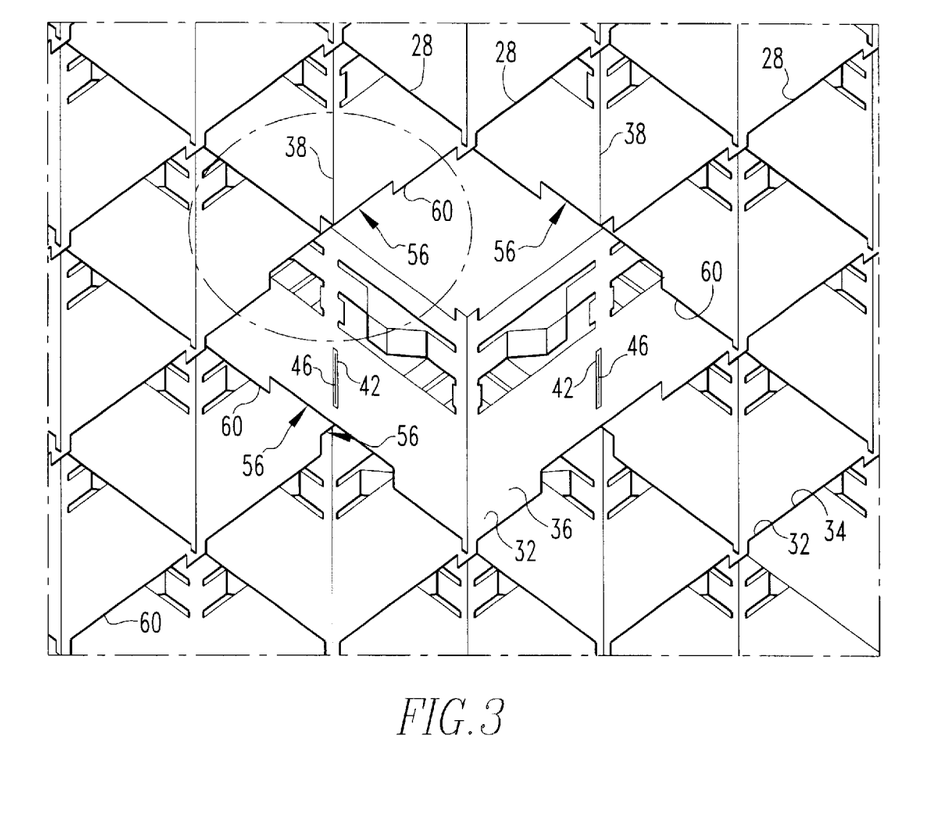
FIG. 3 is a view similar to FIG. 2, except with the spacer removed.
Figure 4:
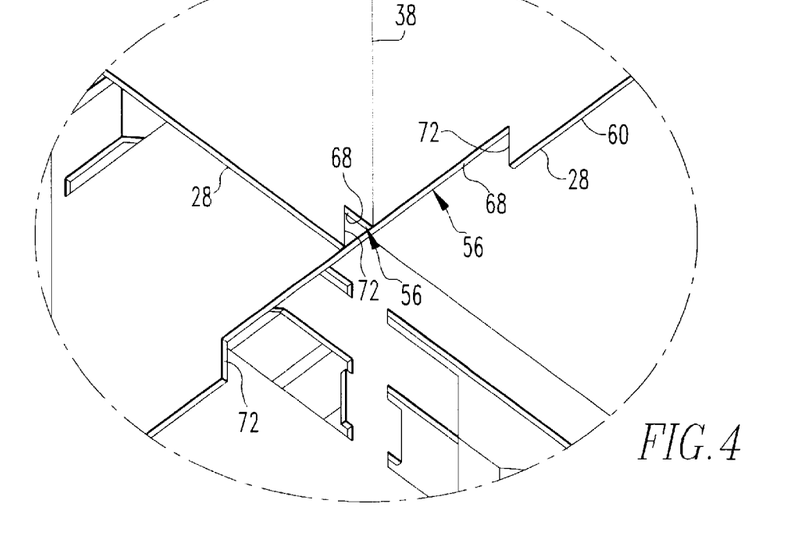
FIG. 4 is an enlarged view of the portion of FIG. 3 encircled by a phantom line.
Figure 5:
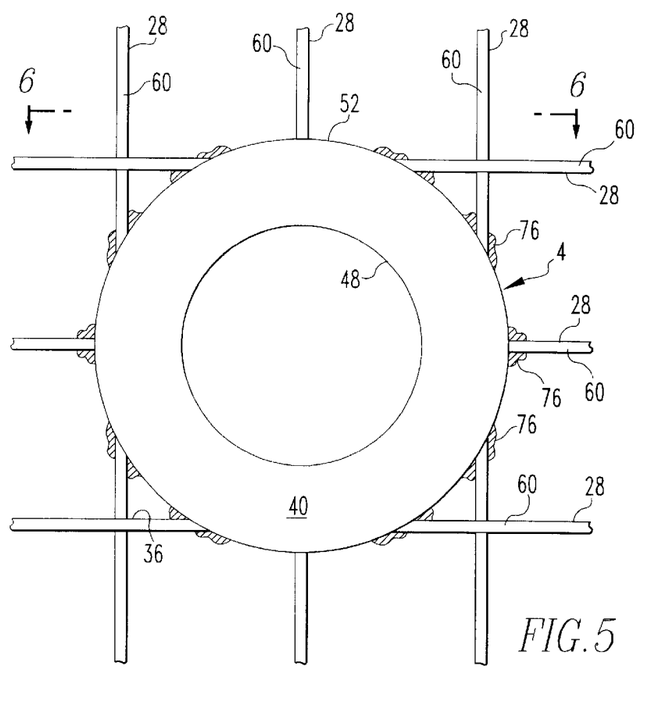
FIG. 5 is a bottom plan view of the spacer and a portion of the protective grid.

As is best shown in FIG. 3, the straps 28 are arranged to define the fuel rod cells 34 and the thimble cells 36 on the protective grid 8. As is depicted in FIGS. 1–3, each of the thimble cells 36 occupy substantially the space of four of the fuel rod cells 34. In this regard, it is understood that the thimble tubes 24 are received in the thimble cells 36, and the fuel rods (not shown) are received in the fuel rod cells 34. The fuel rod cells 34 typically each include a plurality of springs and/or dimples that are formed on the straps 28 and that retain the fuel rods in position within the fuel rod cells 34.

As can further be seen in FIG. 3, the thimble cells 36 each occupy the same area as a two by two section of fuel rod cells 34, such that the thimble cells 36 are each substantially larger than the fuel rod cells 34. It can be further be seen from FIG. 3 that as to each thimble cell 36, a strap 28 terminates at and is connected with another perpendicular strap 28 at four terminal intersections 38 about each thimble cell 36. At each such terminal intersection 38, the terminating strap 28 is formed with a small tab 46 that is received in a correspondingly shaped slot 42 formed in the perpendicular strap 28. The engaged tab 46 and slot 42 of each intersection 38 is then welded or otherwise fastened from the interior of the thimble cell 36.

It is understood, however, that in other configurations of the nuclear reactor 16 the protective grid 8 may be configured such that the thimble cells 36 are of the same size as the fuel rod cells 34 such that the thimble cells 36 include no such terminal intersections 38. In such a configuration, the spacers 4 would be reconfigured to fit and cooperate with such relatively smaller sized thimble cells.

As can be seen in the accompanying figures, each spacer 4 is a generally washer-shaped plate of material that is generally circular in cross section and includes a generally planar engagement surface 40 and a generally planar retention surface 44 opposite one another. The spacer 4 additionally is formed with a substantially circular hole 48 formed generally centrally therein and extending between the engagement and retention surfaces 40 and 44. The spacer 4 further includes an arcuate perimeter surface 52 extending peripherally along the spacer 4 between the engagement and retention surfaces 40 and 44. It will be understood, however, that the spacers 4 may be of other non-circular cross sections depending upon the specific needs of the particular application without departing from the concept of the present invention.

It can further be seen from FIG. 3 that the straps 28 adjacent the thimble cells 36 are formed with notches 56 that are configured to receive one of the spacers 4 therein. Each of the straps 28 includes an edge 60, and the edges 60 of the straps 28 of the protective grid 8 are generally aligned along a plane that defines a grid surface 64. As is best shown in FIG. 6, each notch 56 includes a notch base 68 and at least one notch side 72, each notch base 68 being spaced from the edge 60. In this regard, it can be seen that the straps 28 that terminate at the terminal intersections 38 include only a single notch side 72, while the non-terminating perpendicular straps 28 include a pair of notched sides 72.

The notches 56 in the straps 28 are arranged to receive the spacer 4 therein with the retention surface 44 being disposed against the notch bases 68. The notches 56 may be configured to provide a slight interference fit to the spacer 4 whereby the perimeter surface 52 is engaged against the notch sides 72.

With the spacers 4 received in the notches 56, the spacer 4 is then fastened to the straps 28 by welding or other appropriate attachment methodology. In this regard, it can be seen that a weld 76 is formed between the perimeter surface and each notch side 72, and such welds 76 advantageously are formed substantially during the same welding operation as when the straps 28 are welded to one another to form the protective grid 8. While the protective grid 8 is depicted herein as being assembled by welding, it is understood that other attachment methodologies such as brazing, adhering, and the like potentially may be employed to fasten the straps 28 to one another and to the spacer 4 without departing from the concept of the present invention.

In assembling the protective grid 8 with the integrally welded spacers 4, a first plurality of the straps 28 and a second plurality of the straps 28 are arranged in an appropriate fixture (not shown) that retains the straps 28 in a grid or lattice configuration. Prior to welding the straps 28, however, the spacers 4 are positioned in the notches 56 and are likewise retained in place by the same fixture that retains the straps 28 in the grid or lattice configuration. Once the straps 28 and spacers 4 are fixed in position by the fixture, the straps 28 are welded to one another and the spacers 4 are welded to the notched sides of the straps 28 with the welds 76, substantially in a single welding operation. Such a welding operation may be performed by a computer driven welding machine and may include laser welding, although it is understood that other types of welding machines and attachment methodologies may be employed without departing from the concept of the invention.

After the single welding operation has affixed these straps 28 to one another and to the spacers 4, the assembled protective grid 8 with integrally welded spacers 4 is removed from the fixture. It can thus be seen that by providing the spacer 4 that is disposed in the notches 56 of the straps 28 instead of being disposed within the thimble cells 36 formed in a completed protective grid 8, the straps 28 and the spacers 4 can be assembled together in a single arranging operation and a single welding or fastening operation.

It can be seen that once the spacers 4 are received in the notches 56, the edges of the spacer 4 extend across the terminal intersections 38. Such an oversized and overlapping configuration of the spacer 4 provides a large number of points at which the welds 76 can be formed between the spacer 4 and the straps 28, yet does not interfere with the fuel rods (not shown) being received in the cells 32. It is understood, however, that in other embodiments (not shown) the spacers 4 may be sized slightly smaller to not include such an overlapping or oversized aspect.

As can be seen in FIG. 6, the notches 56 are each of a depth 80 that is measured between the edge 60 and the notch base 68. It can further be seen that the spacers 4 are of a thickness 84 measured between the engagement and retention surfaces 40 and 44 that is greater than the depth 80. As such, with the spacers 4 received in the notches 56 such that the retention surfaces 44 are disposed against the notch bases 68, the engagement surfaces 40 protrude outwardly beyond the grid surface 64 of the protective grid 8. Regardless of the specific relationship between the depth 80 and the thickness 84, however, the engagement surfaces 40 protrude outwardly beyond the grid surface 64.

It can further be seen that by mounting the spacer 4 within the notches 56 and by welding the perimeter surface 52 to the notch sides 72 instead of to the planar surfaces of the straps 28, the present device avoids the need to weld the spacers 4 to the terminal intersections 38, which would be extremely difficult. As such, the configuration of the present device overcomes the shortcomings of previous protective grids having thimble cells corresponding with a two by two set of fuel rod cells that otherwise would have employed previously known sleeves or inserts.

As is best shown in FIG. 7, each thimble tube 24 terminates at an end 88 that is receivable in one of the thimble cells 36. The thimble tube 24 is internally threaded at the end 88, with the threads being co-operable with a threaded fastener 92 that is receivable through the hole 48 in the spacer 4. The fastener 92 includes a radially outwardly extending shoulder 96 that is engageable with a counterbore surface 100 formed on the nozzle 12 adjacent an opening 104 that extends through the nozzle 12.

The fuel assembly 14 is assembled by receiving the end 88 of the thimble tube 24 in the thimble cell 36 and against the retention surface 44, and by receiving the fastener 92 through the opening 104 and the hole 48 and threading the fastener 92 with the thimble tube 24. When the fastener 92 is tightened with respect to the thimble tube 24, the shoulder 96 engages the counterbore surface 100, thereby engaging the end 88 of the thimble tube 24 against the spacer 4 and interposing the spacer 4 between the end 88 and the nozzle 12. Inasmuch as the engagement surface 40 of the spacer 4 protrudes outwardly from the grid surface 64 of the protective grid 8, the grid surface 64 and thus the protective grid 8 are spaced from the nozzle 12. Such a mounting methodology is used for each of the thimble tubes 24 of the fuel assembly 14.

It can thus be seen that the spacer 4 advantageously spaces the protective grid 8 from the nozzle 12 within the fuel assembly 14. In this regard, the spacer 4 is integrally welded or otherwise fastened to the protective grid 8 substantially in a single arranging operation and a single welding operation with resulting cost savings. Additionally, by welding the perimeter surface 52 of the spacer 4 to the notch sides 72 with the welds 76 instead of attempting to weld the perimeter surface 52 to the planar surfaces of the straps 28 opposite the terminal intersections 38, the spacer 4 is reliably welded to the protective grid 8 with minimal labor and expense. In this regard, the spacer 4 is advantageously configured to permit the protective grid 8 (with spacers 4) to be securely disposed against the lower nozzle 12, with the design of the spacer 4 maximizing the manufacturability of strong robust connections between the protective grid 8 and the spacers 4.

As indicated above the spacer 4 may be of other shapes than that depicted herein depending upon the configuration of the protective grid 8 and the specific needs of the particular application. It is also understood that other grids than the protective grid 8 may be used in conjunction with the spacer 4 for anchoring at and spacing from the lower nozzle 12.

While a particular embodiment of the present invention has been described herein, it is understood that various changes, additions, modifications and adaptations may be made without departing from the scope of the present invention, as set forth in the following claims.

What is claimed is:

1. In combination, a grid and a spacer for use in a fuel assembly of a nuclear reactor, the fuel assembly including a nozzle, a thimble tube having an end, and a fastener, the fastener being structured to be cooperably connected with the thimble tube, the combination comprising:

a grid including a plurality of straps interconnected with one another to define at least a first thimble cell, the straps each including an edge;

a spacer in the form of a plate formed with a hole extending therethrough, the plate having a substantially planar engagement surface and a substantially planar retention surface opposite one another;

the plate being fixedly mounted on the grid with the engagement surface protruding outwardly from the grid;

the engagement surface being structured to be disposed against the nozzle to space the grid from the nozzle;

the hole being structured to receive at least a portion of the fastener therethrough, and the retention surface being structured to receive the end of the thimble tube against it such that the plate is interposed between the nozzle and the end of the thimble tube when the fastener is received through the hole and is cooperably connected with the thimble tube;

in which at least one of the straps that define the at least first thimble cell includes a notch formed in the edge, the plate being at least partially disposed in the notch; and in which the notch defines a notch base and at least a first notch side on the at least one of the straps, and in which the plate includes a perimeter surface between the engagement and retention surfaces, the combination including at least one of the retention surface engaging the notch base and the perimeter surface engaging the at least first notch side.

2. The combination as set forth in claim 1, in which the retention surface is disposed against the notch base, the plate being of a thickness defined between the engagement and retention surfaces, the notch of the at least one of the straps being of a depth measured between the edge and the notch base, the depth of the notch being less than the thickness of the plate.

3. The combination as set forth in claim 1, in which the retention surface is disposed against the notch base, and in which the perimeter surface is welded to the at least first notch side.

4. The combination as set forth in claim 1, in which the spacer is generally circular in shape, and in which the hole is substantially circular in cross section, the hole being generally centrally disposed on the plate.

5. The combination as set forth in claim 1, in which the edges of the straps are generally aligned along a plane that defines a grid surface of the grid, the engagement surface of the plate being spaced from the grid surface.

6. The combination as set forth in claim 5, in which the engagement surface is substantially parallel with the grid surface.

7. A fuel assembly for use in a nuclear reactor, the fuel assembly comprising:
- a grid including a plurality of straps interconnected with one another to define at least a first thimble cell, the straps each including an edge, the edges being generally aligned along a plane that defines a grid surface of the grid;
- a first spacer in the form of a first plate having a substantially planar engagement surface and a substantially planar retention surface, the first plate being fixedly mounted on the grid with the engagement surface protruding outwardly from the grid surface;
- the first plate being formed with a hole extending therethrough;
- a thimble tube having an end, at least a portion of the thimble tube being received in the at least first thimble cell;
- a nozzle formed with at least a first opening; and
- a fastener engaged with the thimble tube, at least a portion of the fastener extending through the at least first opening in the nozzle, at least a portion of the fastener extending through the hole in the first plate;
- the first plate being interposed between the nozzle and the end of the thimble tube, with the engagement surface being disposed against the nozzle and the retention surface being disposed against the end of the thimble tube such that the grid surface is spaced from the nozzle;
- in which at least one of the straps that define the at least first thimble cell includes a notch formed in the edge, the first plate being at least partially disposed in the notch; and
- in which the notch defines a notch base and at least a first notch side on the at least one of the straps, and in which the first plate includes a perimeter surface between the engagement and retention surfaces, the combination including at least one of the retention surface engaging the notch base and the perimeter surface engaging the at least first notch side.

8. The fuel assembly as set forth in claim 7, in which the retention surface is disposed against the notch base, the first plate being of a thickness defined between the engagement and retention surfaces, the notch of the at least one of the straps being of a depth measured between the edge and the notch base, the depth of the notch being less than the thickness of the first plate.

9. The fuel assembly as set forth in claim 7, in which the retention surface is disposed against the notch base, and in which the perimeter surface is welded to the at least first notch side.

10. The fuel assembly as set forth in claim 7, in which the first spacer is generally circular in shape, and in which the hole is substantially circular in cross section, the hole being generally centrally disposed on the first plate.

11. The fuel assembly as set forth in claim 7, in which the engagement surface is substantially parallel with the grid surface.

12. The fuel assembly as set forth in claim 7, further comprising a second spacer in the form of a second plate having a substantially planar engagement surface and a substantially planar retention surface, the second plate being fixedly mounted on the grid with the engagement surface thereof protruding outwardly from the grid surface, the engagement surfaces of the first and second plates being substantially coplanar.

* * * * *